J. HALL.

Toy Money-Box.

No. 7,904. Reissued Oct. 9, 1877.

Witnesses:

G. B. Towles.

H. A. Daniels

Inventor:

John Hall by W. Burris

Attorney.

N. PETERS, PHOTO-LITHOGRAPHER, WASHINGTON, D. C.

UNITED STATES PATENT OFFICE.

JOHN HALL, OF WATERTOWN, MASSACHUSETTS.

IMPROVEMENT IN TOY MONEY-BOXES.

Specification forming part of Letters Patent No. 145,734, dated December 23, 1873; Reissue No. 7,904, dated October 9, 1877; application filed September 5, 1877.

*To all whom it may concern:*

Be it known that I, JOHN HALL, of Watertown, in the county of Middlesex and State of Massachusetts, have invented certain new and useful Improvements in Toy Money-Boxes; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
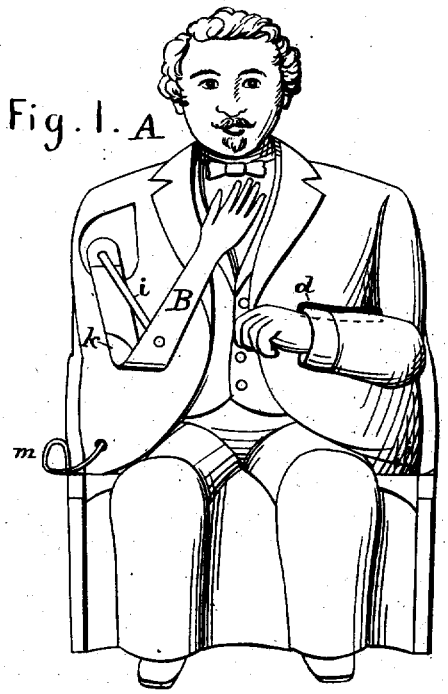
Figure 2:
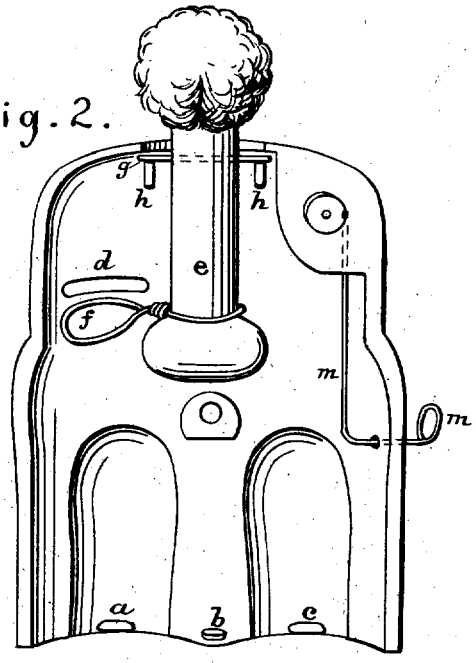
Figure 3:
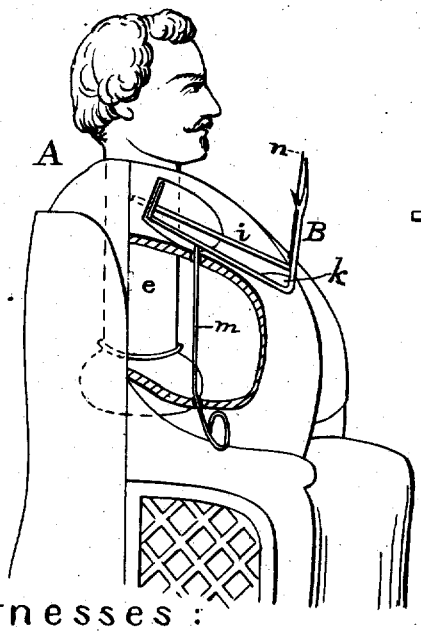
Figure 4:
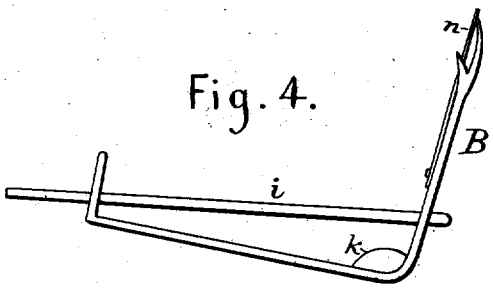

Figure 1 is a front view. Fig. 2 is a vertical section, looking toward the front of the figure. Fig. 3 is a side view, with part of the plate removed, showing the movable arm and wire for holding it in an upright position. Fig. 4 is a view of the movable arm detached.

My invention relates to a toy money-box, which I term "The Tammany Bank;" and consists in the mechanical figure of a man, the body of which is hollowed, and provided with an aperture or pocket, and a movable arm and hand, for receiving and depositing money; and the head of the figure is adjusted to be oscillated backward and forward by the action of the descending coin, causing a motion of recognition by the head of the figure, substantially as hereinafter set forth.

A is the figure of a man, seated in an armchair, which may be cast, of any suitable material, in two sections, and fastened together by a screw, and the bottom of the box is secured in place by the lugs *a b c* cast on the inside of the plates. B represents a movable arm, attached by a rod, *i*, fastened to the shoulder and to the fore-arm, as shown in Fig. 3 of the drawings, so as to allow free motion of the arm. Above the left arm is an aperture, *d*, representing a pocket to receive the deposits. A weight, *k*, at the elbow serves to hold the fore-arm in an upright positiou when no coin is in the hand.

A small wire, *m*, is inserted through a hole in the right side of the figure, and, being bent, is extended upward through another hole in the plate under the movable arm, and adjusted to bear against the arm by pressing the wire inward, for holding the fore-arm firmly in an upright position while a coin is being placed in the hand.

On the inside of the fore-arm a spring, *n*, is attached, which is extended to or beyond the fingers, as shown in Fig. 3, for holding a coin in the hand while it is being conveyed to the pocket. The neck *e*, upon the top of which is formed the head of the figure, extends downward, and is provided with an arm, *f*, extending under the pocket, and the neck and head are supported in position by a pin, *g*, extended through the neck, and resting on the lugs *h* cast on the inside of the figure for that purpose.

The weight of a coin, placed between the spring and hand, bears the hand downward to the pocket, dropping the coin in the pocket; and the descending coin strikes the arm *f*, causing a motion of recognition by the head of the figure.

What I claim as new, and desire to secure by Letters Patent, is—

1. A toy money-box, consisting of a mechanical figure of a man hollowed, and provided with an aperture for receiving deposits, and a movable arm having a hand for conveying deposits through the aperture into the box, substantially as described.

2. A toy money-box, consisting of the mechanical figure of a man, having the head of the figure adjusted to be oscillated by the action of the descending coin, to produce a motion of recognition by the head of the figure, by mechanism substantially as described.

3. The movable arm B, provided with a spring, *n*, for holding a coin in the hand of said arm, substantially as described.

4. A toy money-box, having a movable arm, B, adjusted to and held in an upright position while a coin is being placed in the hand of said arm by means of a wire, *m*, or equivalent device, substantially as described.

Witness my hand this 29th day of August, 1877.

JOHN HALL.

Witnesses:
CHARLES W. BERRY,
CYRUS H. CAMPBELL.